United States Patent
Rich

[11] 3,727,121
[45] Apr. 10, 1973

[54] STEP MOTOR DAMPING METHOD AND APPARATUS

[75] Inventor: Leonard G. Rich, West Hartford, Conn.

[73] Assignee: The Gerber Scientific Instrument Company, Hartford, Conn.

[22] Filed: Apr. 8, 1971

[21] Appl. No.: 132,355

[52] U.S. Cl. ............ 318/696, 318/685, 318/254, 318/327
[51] Int. Cl. ............................................ H02k 29/00
[58] Field of Search ............... 318/138, 254, 696, 318/685, 439, 327

[56] References Cited

UNITED STATES PATENTS

| | | |
|---|---|---|
| 3,423,658 | 1/1969 | Barrus ............................ 318/696 |
| 3,466,520 | 9/1969 | Aylikci et al. .................... 318/696 |
| 3,385,984 | 5/1968 | O'Regan .......................... 318/696 |
| 3,345,547 | 10/1967 | Dunne ............................. 318/254 |
| 3,530,347 | 9/1970 | Newell ............................. 318/138 |
| 3,274,471 | 9/1966 | Moczala .......................... 318/254 |
| 3,304,481 | 2/1967 | Saussele ......................... 318/254 |
| 3,573,593 | 4/1971 | Beery .............................. 318/696 |

Primary Examiner—G. R. Simmons
Attorney—McCormick, Paulding & Huber

[57] ABSTRACT

A step motor damping apparatus and method which provide electrical damping of the step motor motion. A damping control signal is derived from the electromotive force induced in certain stator pole windings of the step motor by the moving motor armature. A damping force on the armature is produced by energizing the same or other motor poles in response to the damping signal.

15 Claims, 5 Drawing Figures

PATENTED APR 10 1973

INVENTOR
LEONARD G. RICH

By *McCormick, Paulding & Huber*
Attorneys

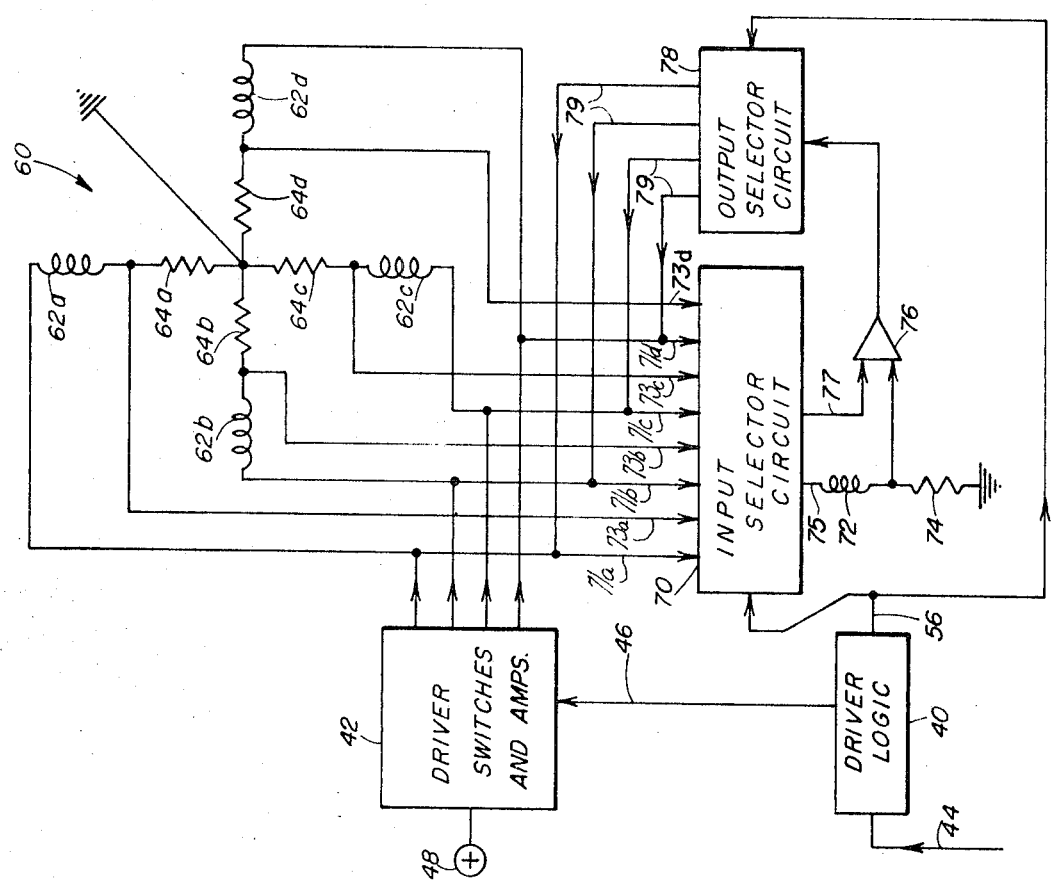
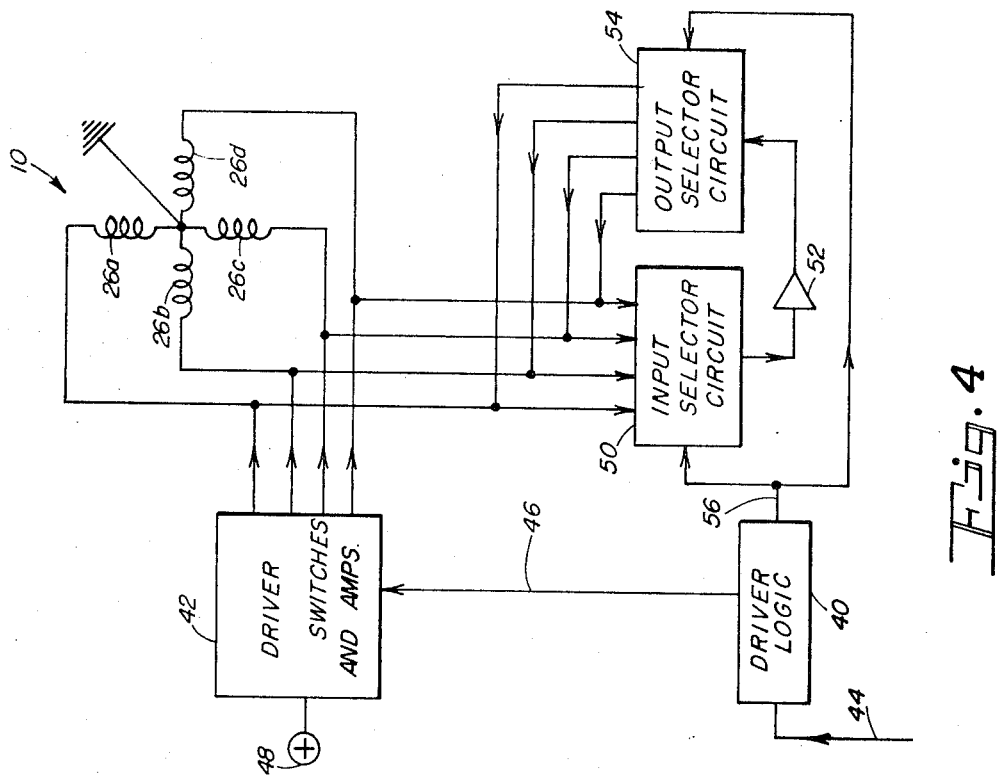

STEP MOTOR DAMPING METHOD AND APPARATUS

BACKGROUND OF THE INVENTION

This invention relates to the field of electric motors and, more particularly, is concerned with motors of the impulse type, commonly referred to as stepping motors, wherein the armature of the motor is moved in a number of discrete displacements or steps as a result of a corresponding number of discrete changes in the electrical energization scheme of the motor pole windings.

In both rotary and flat or linear step motors of the type to which the present invention is directed, the motor is composed generally of a movable armature adapted for connection to a mechanical load and a stator assembly or base platen having a number of magnetically permeable poles. A suitable electrical drive logic or control unit which forms a part of the stepping motor drive system operates to excite the windings of the motor poles in such a manner that a magnetic field is created which produces a magnetomotive force or torque which urges the motor armature to assume a mechanical position in line with the resultant magnetic field. The control unit changes the excitation state or condition of the pole windings in a phased sequence to cause the magnetic field to move in a step-by-step fashion and as the magnetic field so moves, the motor armature follows with a corresponding step-by-step movement.

Depending upon the number of leads or windings available as separate inputs, the motor may require three, four, five or more changes in the phased excitation sequence to achieve a complete cycle of electrical excitation, generally defined as 360° of electrical rotation. The actual mechanical movement of the motor armature produced by 360 electrical degrees of rotation may not correspond to 360° of mechanical rotation in rotary motors, but depends instead upon the geometry and design of the particular motor. In both rotary step motors and flat or linear steps motors, the latter of which are basically rotary motors of infinite armature radius, some definite number of discrete steps and a definite amount of mechanical movement is always prevalent or directly associated with each cycle of the electrical excitation. In a simple rotary motor, one full rotation of the armature may result from 360 electrical degrees of rotation with four steps being required to achieve such rotation. In other rotary motors of a slightly more complex geometry, 200 steps or more may be required to obtain 360 mechanical degrees of rotation of the armature. In the latter motors, a complete 360° cycle of mechanical rotation may be accompanied by many full cycles of electrical excitation.

In both flat and rotary step motors, the motor armature is urged to make an instantaneous motion toward the next magnetically stable position after each step change in the excitation of the pole windings. Assuming no static load on the motor armature and no damping, the motor armature responds to the step change by accelerating toward the newly commanded position until that position is reached. At the new position, the torque on the armature due to the magnetic field is reduced to zero; however, the kinetic energy acquired by the armature during acceleration toward the new magnetically stable position carries the armature past the new position and a torque reversal is automatically generated to return the armature toward the commanded position. The reversal of the torque on the armature continues to retard the overshooting motion of the armature until the kinetic energy is entirely converted to potential energy in the magnetic field at the new position. At this point, the armature is accelerated back toward the commanded position and again overshoots the position but in the opposite direction. The oscillatory motion of the armature about the commanded position continues until the energy of the system has been dissipated in the same manner as in the classical mass-spring system.

The oscillation and overshoot of the armature at the newly commanded position is ordinarily not desirable and may degrade the output of the step motor, particularly at low motor speeds, to a point which makes it unacceptable for functions, such as controlling the movement of a cutting tool or plotting stylus in programs which include low velocity routines in one or more of its coordinate directions of movement.

Accordingly, it is desirable to have a method and apparatus for damping the movement of a step motor armature to eliminate the undesirable oscillatory overshoot normally associated with each discrete displacement of such armature.

SUMMARY

The present invention resides in a method and apparatus for damping the oscillatory overshoot movements of a step motor armature. The invention employs a sensing means incorporating the motor poles and windings, for detecting the oscillatory overshoot movement of the step motor armature, and force generating means connected between the sensing means and the motor armature for imposing a damping force on the armature in response to the movement detected by the sensing means. The sensing means detects the change in magnetic flux in the motor poles caused by the oscillatory overshoot movements of the armature, which flux change is manifested as an electromotive force or voltage induced in the motor pole windings. This voltage is sequentially detected in selected pole windings which due to their momentary arrangement relative to the armature have passing therethrough a magnetic flux which is substantially linearly related to the displacement of the armature from its commanded position with the result that the detected voltage signal is substantially a sine wave in phase with the velocity of the armature as it undergoes its oscillatory overshoot movement. The force generating means responds to the detected voltage signal and produces a related damping force on the motor armature. The force generating means in a preferred embodiment includes sequentially selected pole windings which are excited by the detected voltage signal so that a magnetomotive damping force is imposed on the armature to damp the armature movements.

BRIEF DESCRIPTION OF THE DRAWINGS

FIG. 4 is a diagram showing the components in a step motor drive system embodying the present invention.

FIG. 5 is a diagram showing the components of another step motor drive system embodying the present invention.

DESCRIPTION OF THE PREFERRED EMBODIMENTS

Figure 1:
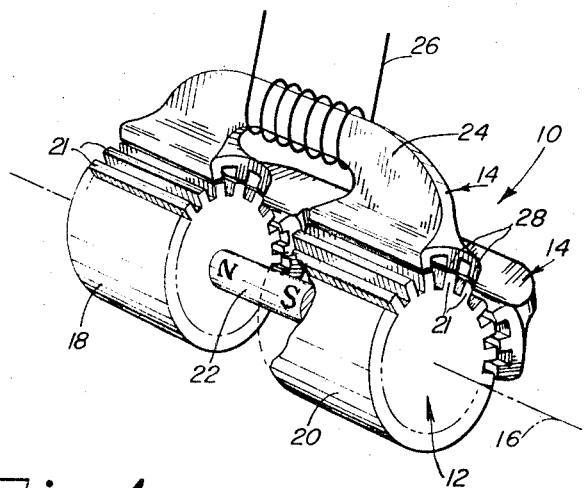
FIG. 1 is a perspective view of the principal operating components of a rotary step motor.

FIG. 1 shows the principal components of a rotary step motor, generally designated 10, which may be damped according to the method and apparatus of the present invention. The principal components of the motor 10 include a rotor or rotary armature 12 and stator poles 14, 14. It should be understood that a plurality of stator poles 14, 14 are distributed at evenly spaced intervals around the armature 12; however, for the purposes of clarity, only two such poles are shown in FIG. 1. In a complete motor, the rotary armature 12 is supported by suitable bearings along its axis of rotation 16 within a casing to which the stator poles 14 are fixedly attached. Since the detailed construction of the motor casing and the bearing structure is not essential to a clear understanding of the present invention, such details have been omitted and only the principal components which produce the stepping motion of the rotor are shown.

The rotary armature 12 is the movable element of the rotary step motor 10 and includes two cylindrical end members 18 and 20 and a coaxial permanent magnet 22 interconnecting the members 18 and 20. The north and south poles of the magnet 22 are indicated by the letters "N" and "S," and confront axial faces of the members 18 and 20 respectively. The cylindrical members 18 and 20 and the magnet 22 form a composite body which is symmetrically disposed about axis 16.

Each of the end members 18 and 20 has a similar construction and is formed from a magnetically permeable material such as iron or steel alloy. The circumferential surfaces of the members 18 and 20 include a plurality of axially extending parallel grooves which define a number of teeth 21, 21 spaced evenly about the circumferential surface of the members. As a result of the magnet 22 the end member 18 is charged magnetically north and the end member 20 is charged magnetically south.

Each stator pole 14 is basically an electromagnet composed of a magnetically permeable core 24 and an excitation winding 26. The opposite ends of the core 24 each have three axially extending teeth 28, 28 which are of circumferential width and spacing equal to the circumferential width and spacing of the rotor teeth 21, 21. The radial distance between the teeth 28, 28 of the pole 14 and the adjacent rotor teeth 21, 21 is relatively small in comparison to the circumferential separation between the teeth. In this manner, a complete magnetic flux path can be traced through the armature 12 and each of the poles 14, 14.

Figure 2:
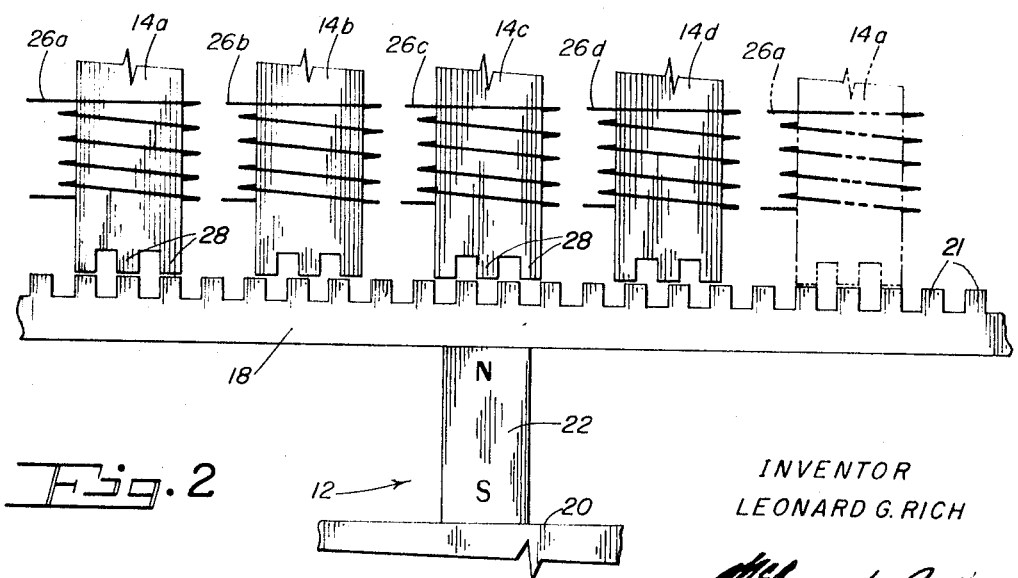
FIG. 2 is a schematic representation of a portion of a rotary step motor which has been flattened into a linear configuration for purposes of understanding the operation of a step motor.

In order to more clearly understand the operation of the step motor 10, the end member 18 and the mating end portions of a plurality of the stator poles 14, 14 have been distorted into a flattened configuration in FIG. 2. To identify the poles 14, 14 and their subparts, the same reference numeral is given to corresponding parts of the poles and a letter subscript is added where necessary to distinguish the individual parts of one pole from another. It will be noted that although five poles 14 are shown, to indicate continuity, the pole on the right in FIG. 2 is shown in phantom and designated 14a, the same as the pole on the left, as would be the case where a total of four such poles are evenly distributed at 90° intervals about the cylindrical member 18. While in normal practice the number of poles is much larger than four and depends upon the size of the poles and circumference of the member 18, only four poles are needed to explain the step-by-step sequencing of the rotor.

The rotary armature 12 is shown in FIG. 2 at a position in which three teeth 21, 21 of member 18 are aligned or in registry with the three teeth 28, 28 of pole 14a. A comparison of the relationship between the armature teeth and the pole teeth of the other poles 14b, 14c and 14d discloses that the different poles are spaced so that the teeth on no more than one pole in the set of four are aligned with the teeth on the member 18 at any given time. The teeth of the pole 14c are located directly opposite the spaces between the teeth of member 18 or symmetrically offset from the adjacent teeth on the member 18. The teeth on pole 14b with respect to the teeth of member 18 are in turn asymmetrically offset from the teeth on member 18 or halfway between the aligned position of the teeth on pole 14a and the symmetrically offset position of the teeth on pole 14c. The teeth on pole 14d with respect to the teeth on member 18 are asymmetrically offset from the teeth on member 18 or halfway between the symmetrically offset position of the teeth on pole 14c and the aligned position of the teeth on pole 14a. With the relationship shown, movement of member 18 to the right in FIG. 2 sequentially brings the teeth on the member 18 and the teeth on poles 14b, 14c and 14d into registry in that order and further movement again reestablishes registry with the teeth on pole 14 a at which point the cycle can be repeated.

In one mode of operating the step motor represented in FIG. 2, the poles are excited in what is termed a unipolar manner. Foe example, in a static condition with the components shown as in FIG. 2, the winding 26a of pole 14a is energized producing a magnetic south pole at the pole face adjacent the member 18 and a magnetic north pole at the pole face (not shown in FIG. 2) adjacent the other end member 20. Such excitation in the absence of external loads holds the teeth of armature 12 and pole 14a in alignment since this stable magnetic-mechanical configuration corresponds to the minimum energy condition with maximum flux and maximum permeability.

If the energization of pole 14a is terminated and pole 14b is energized to create a magnetic south pole adjacent the member 18 and a magnetic north pole adjacent the member 20, the armature 12 is caused to index or step by a half-tooth width so that the armature teeth and the teeth on pole 14b become aligned. Subsequent de-energization of pole 14b and energization of pole 14c in the same manner brings the teeth of armature 12 and the pole 14c into alignment since the indexing movement produced by the excitation of pole 14b established the asymmetric offset of the armature teeth and the teeth of pole 14c. In a still further step in the sequence, de-energization of pole 14c and energization of pole 14d produces a further indexing and alignment of the armature teeth and the teeth of pole 14d. Subsequent deenergization of pole 14d and energization of pole 14a reestablishes alignment of the armature teeth and pole 14a and completes the electrical energization cycle and displacement of the armature by one full increment equal to the distance between corresponding edges of adjacent teeth. Accordingly, the four steps of the electrical cycle produce $1/n$ of a complete mechanical revolution of the armature where $n$ equals the number of teeth on the member 18. It is common practice in the step motor art to employ step motor designs which require 200 steps per revolution of the armature by sequential excitation of the stator windings.

The operating mode described above is termed "unipolar" excitation since only one pole is energized at a time and always with the same polarity; however, it is also possible to excite the stator poles in pairs. For example, in addition to exciting pole 14a in FIG. 2 to produce a south pole adjacent member 18, pole 14c can be simultaneously energized to produce a north pole which tends to establish a mutual repulsion between the teeth of pole 14c and the adjacent teeth of member 18. Since the teeth of pole 14c are equidistant from or symmetrically offset from the adjacent teeth of member 18, again the minimum energy condition and a stable magnetic-mechanical configuration are present. Such bi-polar excitation requires alternate reversals of the excitation currents to generate both north and south poles through the same windings and is commonly employed in the step motor art. The damping control of the present invention can be employed with either the uni-polar or bi-polar excitation schemes.

A principal feature of the present invention resides in sensing means which utilizes the windings of the motor poles for detecting oscillatory overshoot movement of the step motor armature.

As described above, the indexing of a motor armature between magnetically stable positions is accompanied by an oscillation of the armature about the motor pole at the newly commanded position. Voltages induced in the non-excited motor pole windings by the oscillating armature bear a unique relationship to the armature velocity and may be utilized as electrical signals for damping the armature motions.

Figure 3:
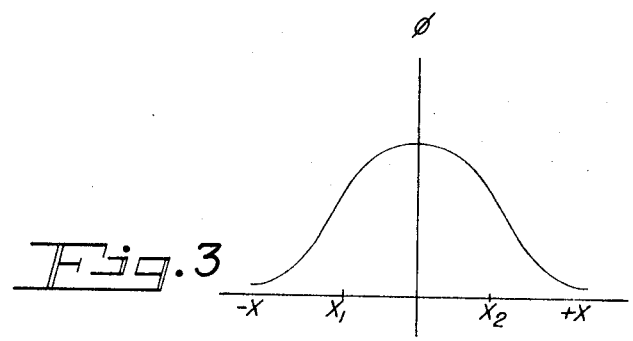
FIG. 3 is a graph showing the magnetic flux passing through a motor pole and its associated armature pole as a function of the deviation of the step motor armature from an aligned or commanded position relative to the motor pole.

FIG. 3 discloses a plot showing the flux $\phi$ between the armature teeth and the excited stator pole teeth of opposite polarity as a function of armature displacement on opposite sides of the magnetically stable, commanded or zero position of the armature adjacent the stator pole. The $-X$ coordinates represent positions on one side of the zero position while the $+X$ coordinates represent positions on the other side. As the armature oscillates about the zero position, a voltage or back EMF (electromotive force) is induced in each motor pole winding and the value of the EMF is equal to $N(d\phi/dt)$, where $\phi$ is the flux and N is the number of linked turns forming the winding.

It is clear from inspection of FIG. 3 that the variation of the voltage induced in an excited pole winding by a single sweep or oscillation of the armature past about the commanded position has such a waveform that the magnitude of the induced voltage is zero at the commanded position even though the velocity of the armature is a maximum at this point. A damping force for an oscillating mass should be generally proportional to the velocity of the mass and have a maximum value when the velocity is at a maximum. Therefore, the voltages induced in the excited pole windings for both uni-polar and bi-polar excitation schemes are not suitable for damping control signals because the voltages do not vary in a proper manner with the armature velocity.

However, if the voltages induced in windings other than those which are momentarily excited in the unipolar and bi-polar excitation schemes are examined, a different relationship between the induced voltages and the armature velocity is found. The teeth of each non-excited pole are asymmetrically offset from the armature teeth or midway between the aligned and symmetrically offset positions and therefore the flux passing through such non-excited pole varies about a point on a flux versus displacement curve which is offset from the commanded or neutral position and which in FIG. 3 may be taken as either the point $X_1$ or $X_2$ depending on the particular non-excited pole examined. By inspection, it is apparent that the non-excited poles have induced in their windings, as a result of the oscillatory overshoot of the armature, voltage waveforms which are approximately proportional to the velocity of the armature since the flux versus displacement curve in the vicinity of $X_1$ or $X_2$ is substantially linear. Accordingly, the set of poles having asymmetrically offset teeth relative to the armature teeth in any given step of the excitation sequence are appropriate sources of an electrical damping signal for attenuating the oscillations of the armature 12 at its commanded position.

Another important feature of the present invention resides in the force generating means for imposing a motion-opposing or damping force on the motor armature. The force generating means responds to the signals produced by the sensing means and also utilizes a set of motor poles having asymmetrically offset teeth during the given step of the excitation sequence in question to damp the armature movements by imposing a magnetomotive damping force on the armature.

Since the motor poles assume different positional relationships with the armature teeth during the different steps of the excitation sequence, the poles used for sensing and for applying damping forces are different for each step and the damping system must include some switching device or devices for connecting other parts thereof to the proper windings at each step position of the motor. In particular, the system includes a first switching or input selector means causing the induced electromotive forces in the proper windings to be detected at appropriate times and a second switching means or output selector which provides reversible current to the proper windings to generate a magnetomotive damping force. One such system is shown in the diagram of FIG. 4.

In FIG. 4 a conventional driver logic 40 and a unit 42, consisting of a set of driver switches and power amplifiers, are operatively connected with the four poles of the step motor 10, shown schematically. The details of the construction of the driver logic and of the driver switches and amplifiers are not shown since they form no part of the present invention and are already well known in the step motor art. In general, input commands, consisting usually of a series of pulses each commanding one stepwise change in the motor energization sequence and a direction signal commanding the direction of motor rotation, are introduced to the driver logic 40 by the line 44 and are converted to signals by the driver logic which are transmitted, through the cable 46, to the driver switches of the unit 42 to cause the windings of the motor to be energized in the proper manner. The detailed construction of a step motor driver having conventional driver logic and driver switches of the type suitable for controlling the step motor in the present invention is shown in the U.S. Pat. No. 3,466,520 to Aylikci et al. issued Sept. 9, 1969.

In the embodiment of the invention in FIG. 4, the magnetomotive damping force on the motor armature is generated by an asymmetric motor pole different from that employed to detect the velocity signal. As used herein, and as previously explained, the term "asymmetric motor pole" is used to refer to a motor pole which at the moment in question is not fully aligned or symmetrically arranged relative to the armature teeth, assuming the armature to be at its commanded position. In order to sense an EMF representative of the armature velocity, each of the motor windings is connected to an input selector circuit 50. The input selector circuit 50 is basically a switching device controlled synchronously with the stepping motion of the motor 10 by signals from the driver logic 40 transmitted to it through a cable 56. More specifically, the input selector circuit 50 is phased with the stepping motions of the motor armature so that it sequentially connects the motor windings to the input of the damping amplifier 52 in such a manner that for each step position of the motor only one winding is connected to the amplifier 52, such one winding being the winding of an asymmetric motor pole. The construction of the selector circuit 50 is similar to the construction of the driver switching unit 42 in analogue form since the switching occurs synchronously with that of the driver switches to transmit analogue voltages from the asymmetric motor pole windings. The damping amplifier 52 responds to the signal induced in the motor winding connected to it by the input selector circuit 50 and as a result produces an output current signal which is supplied through an output selector circuit 54 to another one or more of the asymmetric motor pole windings to generate a magnetomotive force opposing the armature oscillation. The output selector circuit 54 is or may be a switching device generally similar to the input selector controlled by signals issuing from the driver logic 40 through the cable 56 in phased relationship with the stepping motion of the motor 10 to sequentially connect the output of the amplifier 52 to the motor windings in such a manner that for each step position of the motor the output of the amplifier is connected to the winding of at least one asymmetric pole other than the one winding used to produce the input signal. In a motor having a large number of asymmetric poles for each step position the amplifier output is preferably connected to the windings of a number of such poles. For example, if the motor poles and armature are positioned as shown in FIG. 2, the input selector circuit 50 would operate to sense the voltage induced in the winding 26b and the output selector circuit 54 would operate to energize the winding 26d with the output of the amplifier 52.

FIG. 5 discloses another embodiment of the invention which differs from that of FIG. 4 in that it derives the damping control or input signal from the same asymmetric motor pole winding as employed to generate the magnetomotive damping force on the armature. In this embodiment, the driver logic 40 and the driver switch and amplifier unit 42 are or may be the same as those disclosed in FIG. 4. The stepping motor, generally designated 60, has a construction slightly different from the construction of the motor 10 of FIG. 4 in that dropping resistors 64, 64 are connected between the respective motor windings 62, 62 and ground. The input selector circuit 70 has one set of input lines 71, 71 which are sequentially connected, one at a time, through the circuit 70 to a corresponding output line 75 containing a dummy inductor 72 and a dummy resistor 74 connected in series with one another and which have impedance values approximately ten times larger than the individual windings 62, 62 and resistors 64, 64, respectively. At its other end each input line 71 is connected to one end of an associated one of the motor windings and to the output of the driver switch associated with each winding. The circuit 70 also has a second set of input lines 73, 73 which are sequentially connected, one at a time, through the circuit 70 to a corresponding output line 77 leading directly to a differential damping amplifier 76. At its other end each input line 73 is connected to the junction between an associated one of the motor windings and its dropping resistor 64. The motor windings 62, 62 and the resistors 64, 64 are sequentially placed in parallel with the dummy inductor 72 and the dummy resistor 74 through the first set of input lines 71, 71 and the corresponding output line 75 to sequentially form bridge circuits. The inductor 72 and the resistor 74 comprise the high impedance leg of each sequential bridge circuit and the windings 62, 62 and the resistors 64, 64, taken in sequence comprise the low impedance legs of the bridge circuits. The sequencing through the second set of input lines 73, 73 by the input selector circuit 70 is correlated with the sequencing through the first set of input lines 71, 71 so that the balance voltages across each sequentially formed bridge circuit appears at the inputs of the differential amplifier 76.

The output of the amplifier 76 is fed through the output selector circuit 78 to the respective windings 62, 62 over output lines 79, 79. Again, the output selector circuit 78 and the input selector circuit 70 are synchronous switching devices, such as selector circuits 50 and 54 in FIG 4 and are controlled in phased relationship with the stepping rate of the motor by the signals from the driver logic 40 supplied through the cable 56; however, the synchronization is such that the damping signal is detected in the same asymmetric motor pole winding as employed to generate the damping force. In other words, the input line 71 which during any given step position is used to supply the input or damping control signal is connected to the same motor pole winding as the output line 79 on which the output of the output selector 78 appears. While separate dropping resistors 64, 64 are shown incorporated in the motor 60, a single grounded resistor connected to the input line 77 of amplifier 76 would serve the same function provided that the motor windings are not grounded.

The bridge circuits sequentially formed by the input selector circuit 70 utilize the dummy inductor 72 and the dummy resistor 74 to simulate the motor pole windings in the higher impedance leg of the bridge. When no voltage is induced in the asymmetric pole windings by the motor armature, which indicates that the armature is stationary, the bridge is balanced and in a null condition. If the armature is moving, however, the voltage induced in the pole winding of the bridge unbalances the bridge and a reversible damping current is supplied from the amplifier 76 to the same pole winding by the output selector circuit 78 to generate the magnetomotive damping force on the armature.

While the novel step motor damping system has been described in a number of embodiments, it will be understood that numerous modifications and substitutions can be made without departing from the spirit of the invention. For example, where the step motor incorporates more than one set of windings excited in a phased sequence, the damping apparatus need not utilize all of the sets for damping nor is it necessary that the number of specific sets of windings used for sensing be the same as the number of specific sets of windings used for imposing the damping force on the armature. It may also be desirable to incorporate a speed sensing cutout to eliminate the damping force on the armature during high-speed motion of the armature. Such a cutout may be a pulse rate sensor connected to the driver logic 40 and a switch for interrupting the damping amplifier output. It should also be understood that the concept of employing motor pole windings to sense a velocity signal and impose a damping force on the motor armature extends to flat or linear step motors such as the type, for example, in which the motor armature is an electromagnetic head or "forcer" which is translated on a fluid cushion over a magnetically permeable platen having a waffle iron arrangement of teeth by exciting of pole windings of the electromagnetic forcer in a phased electrical excitation cycle. Accordingly, the present invention is disclosed in several embodiments merely by way of illustration rather than limitation.

I claim:

1. In a step motor drive system having a controller which excites the windings of the motor poles in a phased electrical excitation cycle to produce both excited and non-excited motor poles in each step of the phased electrical excitation cycle and to thereby produce motive forces resulting in a stepping motion of the motor armature, the improvement comprising: sensing means incorporating the windings of the motor poles which produce the motive forces for detecting movement of the motor armature through non-excited windings in each phase of the electrical excitation cycle and producing a damping signal; and force generating means including the motor pole windings for imposing through the non-excited windings a damping force on the motor armature in response to the damping signal produced by said sensing means.

2. An improvement as defined in claim 1 wherein said sensing means further includes first sequencing means having inputs connected respectively with the motor pole windings and a signal transmitting output for sequentially detecting electromotive forces induced in the respective pole windings by movement of the motor armature and for sequentially providing the detected electromotive forces at the output.

3. An improvement as defined in claim 2 wherein said first sequencing means is a synchronous switching means connected to the controller and having a switching rate synchronized by the controller with the stepping motion of the armature.

4. An improvement as defined in claim 3 wherein said synchronous switching means has a phase relationship with the stepping motion of the armature which sequentially associates the output of said synchronous switching means with the inputs of said synchronous switching means associated with selected non-excited motor pole windings in the phased electrical excitation cycle.

5. An improvement as defined in claim 3 in the drive system for a step motor having teeth on both the armature and the stationary motor poles which teeth are pitched to cyclically assume symmetric and asymmetric positional relationships with one another as the armature moves relative to the stationary motor poles during the phased electric excitation cycle wherein said synchronous switching means has a phase relationship with the stepping motion of the armature which sequentially associates the output of said synchronous switching means with the inputs of said synchronous switching means associated with the windings of selected motor poles assuming the asymmetric positional relationship in the phased electrical excitation cycle.

6. An improvement as defined in claim 2 wherein the force generating means includes reversible current driver means connected to the signal transmitting output of said first sequencing means and with the motor pole windings for supplying the motor pole windings with a reversible current in response to the induced electromotive forces detected by said first sequencing means.

7. An improvement as defined in claim 6 wherein said reversible current driver means in the force generating means includes a signal amplifier and second sequencing means having an input connected with the amplifier and outputs connected respectively with the motor pole windings for sequentially imposing the amplified signal on the windings and wherein said first and second sequencing means are synchronous switching means connected to the controller of the drive system to synchronize the sequencing of the first and second sequencing means with the phased excitation of the motor pole windings by the controller.

8. An improvement as defined in claim 6 in the driving system having a controller which produces at least two non-excited windings during each phase of a bipolar electrical excitation cycle wherein said first sequencing means is a synchronous switching means connected to the controller and having a switching rate phased by the controller with the stepping motion of the armature for connecting the output of said first sequencing means with an input of said first sequencing means associated with one of the non-excited motor pole windings and said driver means is phased by the controller with the stepping motion of the armature for supplying current to the other of the non-excited motor pole windings.

9. An improvement as defined in claim 6 in the driving system having a controller which produces at least two non-excited windings during each phase of a bipolar electrical excitation cycle wherein said first sequencing means is a synchronous switching means connected to the controller and having a switching rate phased by the controller with the stepping motion of the armature for connecting the output of said first sequencing means with an input of said first sequencing means associated with a non-excited motor pole winding and said driver means is phased by the controller with the stepping motion of the armature for supplying current to the same non-excited motor pole winding.

10. An improvement as defined in claim 1 wherein said force generating means further includes synchronous switching means connected to the motor pole windings and the controller and having a switching rate synchronized by the controller with the stepping motion of the armature for sequentially switching the damping signal between motor pole windings in synchronism with the stepping motion of the armature.

11. The method of damping movements of a step motor armature where the movements are produced by sequentially exciting the windings of the motor poles in a phased electrical excitation cycle comprising the steps of sequentially sensing the electromotive forces induced in selected non-excited motor pole windings by the armature movements in synchronism with the sequential excitation of the phased electrical excitation cycle and; sequentially imposing a damping force on the armature through selected non-excited motor poles in response to the sensed electromotive forces.

12. A method of damping as defined in claim 11 where during each phase of the electrical excitation cycle the armature movements induce electromotive forces uniquely associated with the armature velocity in one set of the non-excited motor pole windings and induce electromotive forces not uniquely associated with the armature velocity in another set of the non-excited motor pole windings wherein the step of sensing further comprises sensing the induced electromotive forces uniquely associated with the armature velocity in said one set of the non-excited motor pole windings during one phase of the electrical excitation cycle.

13. A method of damping as defined in claim 11 wherein the step of imposing comprises sequentially energizing the selected non-excited motor pole windings in synchronism with the phased electrical excitation cycle to generate a magnetomotive damping force on the motor armature.

14. A method of damping as defined in claim 11 in which method the movements of the motor armature at a commanded position of the armature induce electromotive forces having a zero value in a first set of the non-excited motor pole windings and electromotive forces having a non-zero value in a second set of the non-excited motor pole windings wherein the step of sensing comprises sequentially sensing the induced electromotive forces in the non-excited motor pole windings of the second set; and the step of imposing comprises sequentially energizing the non-excited motor pole windings of the second set in response to the induced electromotive forces sensed in the motor pole windings of the second set.

15. The method of damping oscillations of a magnetically polarized motor armature in a step motor as the armature is moved in a stepped manner between commanded positions by excitation of a set of motor pole windings in a phased sequence comprising sensing reversible electromotive forces induced in a non-excited motor pole winding of the set by the armature movements about a commanded position during one phase of the excitation sequence; generating a reversible damping signal in response to the sensed electromotive forces; and energizing a non-excited motor pole winding of the set during the one phase of the excitation sequence in accordance with the reversible damping signal.

* * * * *